Sept. 27, 1927.  1,643,644
H. S. SMITH
PLOW LIFT MECHANISM
Filed April 17, 1922  2 Sheets-Sheet 1
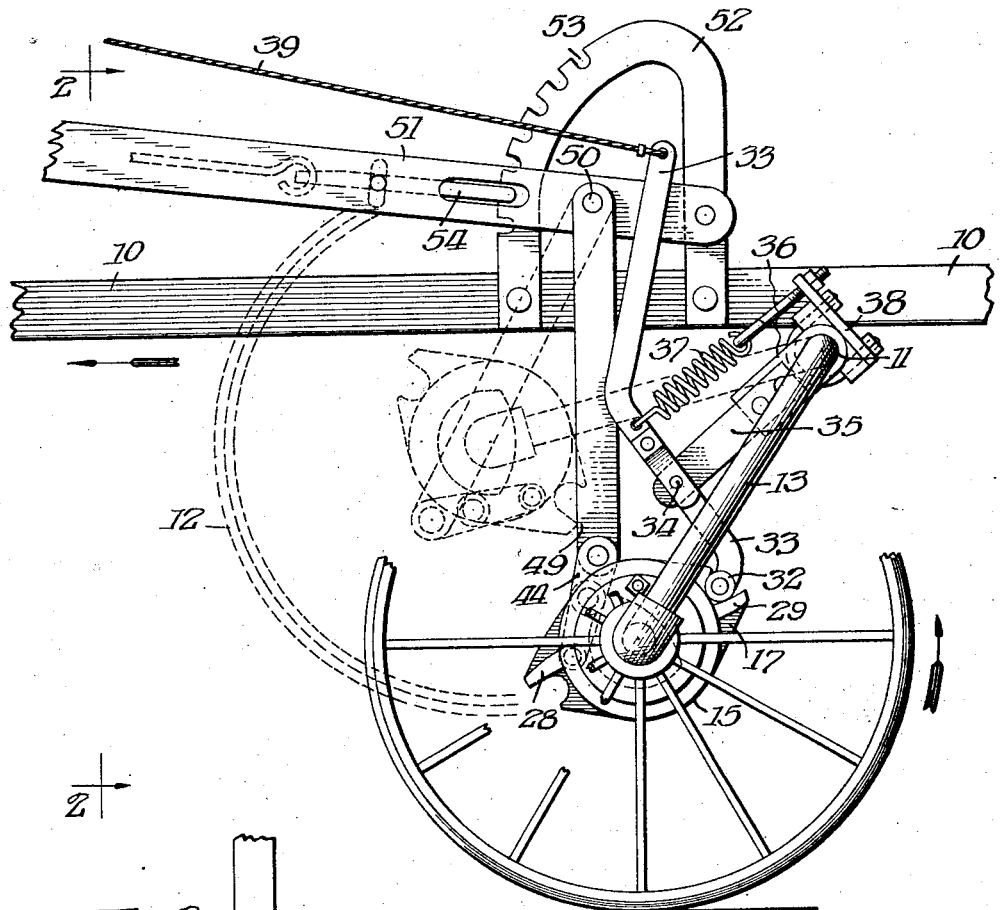
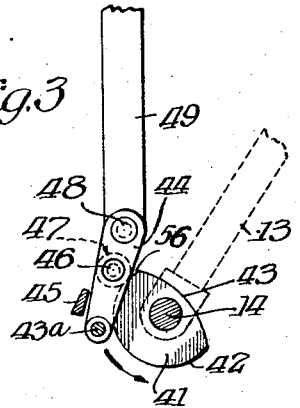
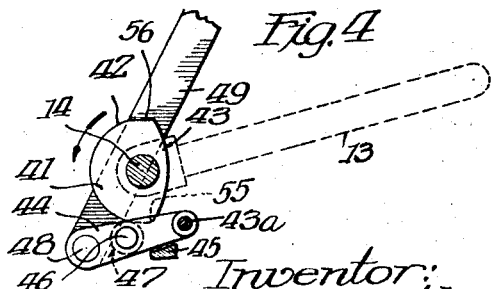
Inventor:
Henry S. Smith,
By Fisher, Fowle, Clapp & Soans
attys.

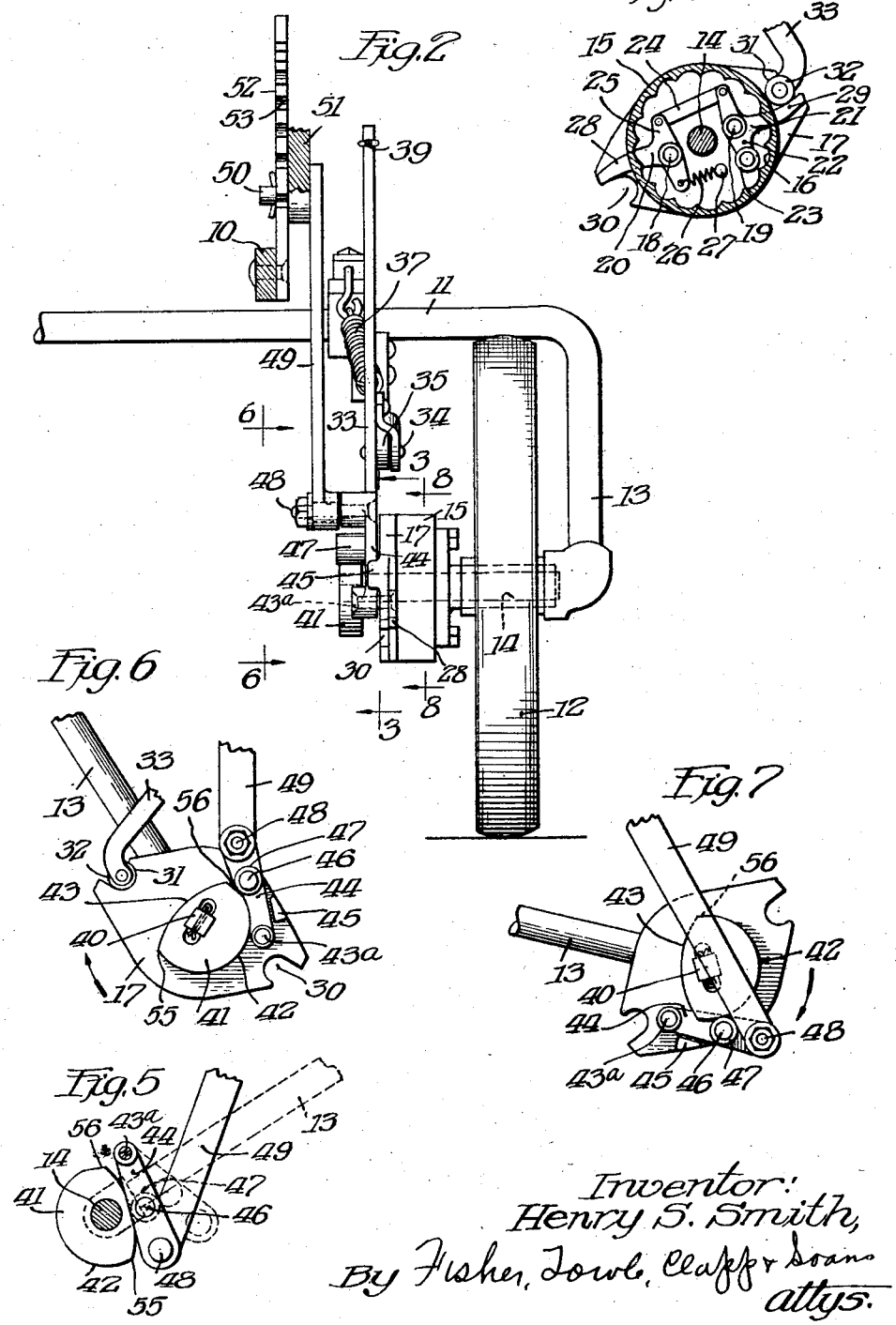

Patented Sept. 27, 1927.

1,643,644

UNITED STATES PATENT OFFICE.

HENRY S. SMITH, OF DIXON, ILLINOIS, ASSIGNOR TO J. I. CASE THRESHING MACHINE COMPANY, OF RACINE, WISCONSIN, A CORPORATION OF WISCONSIN.

PLOW-LIFT MECHANISM.

Application filed April 17, 1922. Serial No. 553,710.

My invention relates to improvements in plow lift mechanism, and, although capable of extended application, is particularly adapted for use in connection with plural bottom tractor plows provided with a frame to which all of the bottoms or other earth-turning bodies are fixedly secured.

The principal object of the invention is to provide a lift mechanism actuated by power derived from one of the wheels of the plow or other implement without the use of reduction gearing, while securing the advantage of a slow powerful lift, when raising the plows out of the ground. Other objects and advantages of the invention are set forth in the following description and claims.

In the drawings accompanying this application,

Fig. 1 is a side elevation of the lift mechanism.

Fig. 2 is an end elevation of the mechanism shown in Fig. 1, being a section taken on the line 2—2 of Fig. 1.

Fig. 3 is a section taken on the line 3—3 of Fig. 2.

Fig. 4 is a view similar to Fig. 3, but showing the plows down, instead of up.

Fig. 5 is a view similar to Fig. 3, but showing the parts in the position occupied when the plows are being raised out of the ground.

Fig. 6 is a section taken on the line 6—6 of Fig. 2.

Fig. 7 is a view similar to Fig. 6, but showing the arrangement with the plows in dropped position, and Fig. 8 is a section taken on the line 8—8 of Fig. 2.

Referring to the drawings, the type of plow to which I have shown the invention applied may be considered as similar to that disclosed in my previous U. S. Patent No. 1,394,767, dated Oct. 25, 1921, which shows a three-bottom tractor plow of what may be termed the frameless type, i. e., one in which the plow bottoms are rigidly secured to a main plow frame.

In this description the numeral 10 represents the main frame to which the plow bottoms or other earth-turning bodies are secured, and 11 represents one of the cranked axles on which the ground wheels, in this instance the land wheel 12, is mounted. As shown in the drawings, such axle 11 has a depending arm 13 provided with a pivot pin 14, on which the land wheel 12 revolves freely. The angular position of the arm 13 of the axle 11 determines the height of the frame 10 above the ground, and hence the position of the plows with reference to the ground.

On the hub of the wheel 12 there is rigidly secured a constantly rotating clutch drum 15 having its interior scalloped out as shown in Fig. 8 to form a circumferential series of depressions 16. There is also mounted to rotate on the pin or stem 14, a clutch plate 17, which, however, is not continuously driven, but is adapted to be intermittently engaged with the constantly rotating clutch member 15.

The clutch plate 17 is equipped with a pair of diametrically opposed pivot studs 18 and 19 which constitute pivots for a pair of three armed bell cranks 20 and 21. The arm 22 of bell crank 21 is equipped at its end with a pin on which is rotatively mounted a clutch roll 23 adapted to be thrown into mesh or engagement with any one of the depressions 16. The opposite arm of the bell crank 21 is connected by means of a link 24 with the adjacent arm 25 of the other bell crank 20 and the opposite arm of said bell crank 18 is connected to one end of a stout tension spring 26. The other end of said tension spring 26 is connected to a pin 27 fixed in the inner face of the clutch plate 17.

As is usual in a clutch arrangement such as I have described, the spring 26, when permitted to do so, will rock the bell cranks 20 and 21 in anti-clockwise direction, as seen in Fig. 8, thus throwing the clutch roll 23 into engagement with one of the depressions 16, thus effecting a driving engagement between the constantly rotating clutch drum 15 and the clutch plate 17. The action of spring 26 is controlled by the usual trip fingers 28 and 29, forming parts respectively of the bell cranks 20 and 21, and extending substantially diametrically of the axis 14 in opposite directions. The clutch plate 17 is also equipped with small notches 30 and 31 which are adapted to receive the trip roll 32 on the lower end of trip lever 33. When the trip roll 32 is positioned in one of said notches 30 or 31, the finger 28 or 29, as the case may be, is engaged by the clutch roll holding the bell cranks rocked on their pivots against the tension of spring 26 and thus freeing the clutch roll 23 from engagement with the depressions 16. Hence, so long as the trip roll 32 occupies one of the notches, the clutch plate 17 will be out of mesh with clutch drum 15 and land wheel 12 will revolve idly without affecting the lift mechanism.

The clutch lever 33 is pivotally supported on a pin 34 fixed on the end of an arm 35 fixedly inserted in a bracket 36 bolted to the axle 11. Normally said clutch lever is pulled in a clock-wise direction (see Fig. 1) by a coiled tension spring 37 connected between the upper end of lever 33 and strap 38 on said bracket 36. Hence, normally, the clutch will be disengaged. When the operator desires, he may trip the clutch by pulling on a cord 39 attached to the upper end of lever 33 whereupon the trip roll 32 will be moved away from the finger 28 or 29 as the case may be, permitting the clutch roll 23 to mesh with one of the depressions 16 and thus establishing a driving engagement between the clutch drum and the clutch plate.

The wheel pivot 14 which is rigid with the lower end of axle arm 13 is squared at its inner end as indicated at 40 to fit a correspondingly shaped aperture in a non-rotary cam 41. Said cam 41, throughout slightly more than half its track surface, is concentric with the axis of pin 14 as indicated at 42, but on that side of the cam which faces toward the axle 13, the concentric surface of the cam drag is cut away, as indicated at 43 to form a somewhat flattened effect or a surface having a much greater radius than the radius of the concentric part 42 of the cam.

In the side of the clutch plate 17 which is remote from the wheel 12, there is fixed a crank-pin 43ª which constitutes a pivot for the end of a swinging cam lever 44; said cam lever 44 is limited as to its outward swinging movement by a small projection 45 cast integral with the clutch plate 17. This projection 45 prevents the cam lever 44 from dropping away from the cam 41 during certain parts of the cycle of operation. At an intermediate point in the length of the cam lever 44, there is fixed a stud 46 which constitutes a journal for a cam roll 47 adapted to roll on the outer edge or track surface of fixed cam 41. The end of cam lever 44 remote from crank-pin 43ª is pivotally connected by means of a suitable bolt 48 with the lower end of a connecting rod or lifting link 49 the upper end of which link is pivotally connected to the frame of the plow bottom 10.

In order to permit adjustment of the bottoms with reference to the frame of the plow, the upper end of link 49 is not connected directly to the plow frame 10, but to a pin or bolt 50 on hand lever 51. Said hand lever 51 is pivoted to a quadrant 52 rigidly secured to the plow frame 10 and provided with a series of notches 53 co-operating with a suitable manually controlled locking tongue 54. By releasing the locking tongue 54 in the usual manner, the hand lever 51 may be rocked on its pivot, thereby rocking crank axle 11, 13 in frame 10 and thus raising or lowering the frame with reference to the axis of land wheel 12.

The operation of the mechanism is as follows. When the bottoms or other earth-turning bodies are in the ground, the position of the parts is as shown in the dotted line position of Fig. 1, Fig. 4 and Fig. 7. In said position the cam roll 47 engages the concentric surface 42 of cam 41. When the operator, desiring to raise the plows out of the ground, pulls on cord 39, the clutch mechanism will be tripped and the rotation of ground wheel 12 will be communicated to the clutch plate 17. Hence clutch plate 17 will commence to revolve in the direction of the arrows, shown in the various figures. Since cam 42 is always stationary on fixed pivot stem 14, the crank stud or pivot 43ª will drag forward link 44 and with it cam roll 47 for a short distance, whereupon cam roll 47 will drop past the point or end 55 of the concentric portion 42 of the cam 41, and will thereby climb up the flattened portion 43 of said cam. Hence, cam roll 47, as soon as it passes point 55 will approach the axis of rotation of the mechanism, thereby causing pivot bolt 48 also, but in a greater degree, to approach the center of rotation, resulting in a shortening of the effective lever arm length between the center of rotation and the bolt 48, and an increase in the lifting power exerted thereby. This effect is clearly illustrated in Fig. 5, where the dotted lines indicate the position in which the parts would be if it were not for the flattening of surface 43. It will be observed by inspection of the figures that a comparatively small elevation or lifting effect is imparted to the stud 48 and link 49 during approximately 60 per cent of the 180° movement of the clutch plate during which the entire lifting operation is effected. Such result is of the highest importance in plows of this character, where all of the bottoms are raised out of the ground at the same time and where the initial lifting of the bottoms from their lowest position in the ground presents the greatest difficulty and requires maximum lifting effort. After the plows have been raised a matter of 2 or three inches, and also since the front end of the frame usually rises first, the sucking effect of the bottoms is destroyed and the remaining portion of the lifting operation requires a comparatively small amount of power. Hence, with my apparatus is secured the effect of reduction gearing during an initial portion of the lifting movement when great power is required.

The arrangement is such that the lifting speed increases rapidly after the clutch plate has revolved through about 60% of its lifting movement. This will be apparent from a study of Figs. 5 and 3 from which it will be seen that during the latter portion of the lifting movement, the cam surface 43 has an effect the reverse of that which it had during the first portion of the lifting movement, that is to say, during the latter portion of the lifting movement, the cam roll 46 is forced outwardly away from the center of rotation, hence, the radius of rotation of pivot bolt 48 or in other words the lever arm length between the center of rotation and the said bolt 48 is correspondingly increased, resulting in a reduction of the power exerted thereby and a rapid increase of speed of lift. When the plows have reached their final raised position, the roller 46, as shown in Figs. 3 and 6, is located on a small flat 56 at the end of the concentric portion 42 of the cam 41.

When it is desired to lower the plows, the operator pulls the cord 39 in the usual way and the tripping of the clutch causes clutch plate 17 to make half of a revolution during which time the cam roller 46 follows around the concentric portion 42 of cam 41. Hence, the effect is as though the pivot bolt 48 were directly connected to or carried by clutch plate 17. It will be understood that during the lowering movement the weight of the plow frame and bottoms acts with instead of against the lift mechanism, the lift mechanism merely serving to control the descent of the plows.

The described details of construction and operation being illustrative of merely a single phase of my invention, it will be understood that the scope of same should be determined by the appended claims, said claims being construed as broadly as possible, consistent with the state of the art.

I claim:

1. In a power lift mechanism for plows, the combination of a plow supporting frame, a ground wheel, a member driven by said ground wheel, a crank pin on said driven member, a link connected at its upper end to said frame, and a variable power driving connection between said crank pin and the lower end of said link, said connection being varied so as to provide a comparatively strong initial lifting power which is reduced in strength as the lifting operation progresses.

2. In a power lift mechanism for tractor plows, the combination of a ground wheel, a member constantly driven by said ground wheel, a rotary crank for lifting the bottoms from the ground, a clutch for connecting said crank and said member, and means for varying the lifting power of said crank during the lifting operation.

3. In a power lift mechanism for plows, the combination of a plow supporting frame, a ground wheel, a member driven by said ground wheel, and a crank pin thereon, a link connected at its upper end to said frame and having at its lower end means connecting it to said crank pin, said means being movable for varying the lever arm length between the center of rotation of said driven member and the lower end of said link, in a fixed cycle during the rotation of the crank.

4. In a power lift mechanism for tractor plows, the combination of a ground wheel, a member constantly driven by said ground wheel, a crank for actuating the plow lifting mechanism, a clutch mechanism for intermittently connecting and disconnecting said crank and member whereby said crank, during its period of movement may be revolved at the same speed as the ground wheel, and means for varying the lifting power of said crank, during the lifting operation.

5. In a lift mechanism for plows, the combination of a frame on which the bottoms may be mounted, a ground wheel, an axle for said ground wheel, and means for effecting relative vertical movement of said frame and wheel comprising a member adapted to be clutched to or disengaged from said wheel to rotate therewith or to remain stationary, a cam lever pivotally connected to said member and a link connecting said cam lever with said frame, and a cam acting on said lever for varying the lever arm length between the center of rotation of said member and the connection between said cam lever and link.

6. In a lift mechanism for plows, the combination of a frame on which the bottoms may be mounted, a ground wheel, an axle for said ground wheel, and means for effecting relative vertical movement of said frame and wheel comprising a rotatable member, a link connected at one end to said frame and having at its opposite end a variable leverage connection with said rotatable member.

7. In a lift mechanism for plows, the combination of a frame on which the bottoms may be mounted, a ground wheel, an axle for said ground wheel, and means for effecting relative vertical movement of said frame and wheel comprising a member adapted to be clutched to or disengaged from said wheel to rotate therewith or to remain stationary, a lever movably connected to said member and a link connecting said lever with the frame, and means including a stationary cam acting on said lever for oscillating said lever to vary the leverage of the connection between said link and said member.

8. In combination a plow frame, an axle journaled in said frame and provided with a depending arm, a ground wheel rotatively mounted on the lower end of said arm, a member adapted to be driven by said wheel, clutch mechanism for causing uni-directional successive rotary movements of said member, two successive movements occurring during and representing a complete revolution of the ground wheel, one of said movements controlling the lifting and the other the lowering of the frame with reference to the wheel, a lever pivotally connected to said member, a lift link connecting said lever to the frame and means for actuating said lever during the lifting movement, comprising a cam stationarily mounted on said arm and means for maintaining said lever in operative position.

9. In combination, a plow frame, an axle journaled in said frame and provided with a depending arm, a ground wheel rotatively mounted on the lower end of said arm, a member adapted to be driven by said wheel, clutch mechanism for causing uni-directional successive rotary movements of said member two successive movements occurring during and representing a complete revolution of the ground wheel, one of said movements controlling the lifting and the other the lowering of the frame with reference to the wheel, a lever pivotally connected to said member, a lift link connecting said lever to the frame and means for actuating said lever during the lifting movement, said means comprising a cam stationarily mounted on said arm and a roller mounted on said lever and operably engaging said cam and means for maintaining said lever in operative position.

10. In a power lift mechanism for tractor plows, the combination of a ground wheel, a member constantly driven by said ground wheel, a rotary crank for lifting the plow bottoms from the ground, a clutch for connecting said crank and said member, and means for automatically varying the lever arm length between said crank and the center of rotation thereof.

11. In an agricultural implement including earth turning means, a power lift mechanism for lifting said earth turning means from operative to inoperative position comprising a rotatable crank, a cam, a lever pivoted on said crank and actuated by said cam; and a connection between said lever and the part to be lifted.

12. In an agricultural implement including earth turning means, a power lift mechanism for lifting said earth turning means from operative to inoperative position, comprising a rotatable member, a variable leverage connection between said rotatable member and the part to be lifted and means for automatically varying said connection during the lifting operation.

HENRY S. SMITH.